United States Patent [19]

Kameda

[11] Patent Number: 5,526,399
[45] Date of Patent: Jun. 11, 1996

[54] DATA TRANSMISSION METHOD AND APPARATUS OF MOBILE RADIOCOMMUNICATION SYSTEM

[75] Inventor: Miho Kameda, Tokyo, Japan

[73] Assignee: NEC Corporation, Tokyo, Japan

[21] Appl. No.: 268,189

[22] Filed: Jun. 29, 1994

[30] Foreign Application Priority Data

Jun. 30, 1993 [JP] Japan ..................... 5-161535

[51] Int. Cl.⁶ .......................... H04Q 7/20; H03M 13/00
[52] U.S. Cl. ................. 379/58; 371/5.5; 371/35
[58] Field of Search ............... 371/5.1, 5.5, 32, 371/33, 34, 35; 375/222, 225, 358; 379/58, 59; 370/17, 84; 455/33.1, 54.1

[56] References Cited

U.S. PATENT DOCUMENTS

| | | | |
|---|---|---|---|
| 4,584,685 | 4/1986 | Gaijar ........................... | 371/35 |
| 4,837,800 | 6/1989 | Freeburg et al. ............ | 379/59 |
| 4,866,712 | 9/1989 | Chao ............................ | 371/5.5 |
| 4,939,731 | 7/1990 | Reed et al. .................. | 371/32 |
| 5,010,553 | 4/1991 | Scheller et al. ............. | 371/35 |
| 5,105,423 | 4/1992 | Tanaka et al. ............... | 371/32 |
| 5,214,637 | 5/1993 | Sridhar et al. .............. | 375/222 |

FOREIGN PATENT DOCUMENTS 61-175968  8/1986  Japan .

OTHER PUBLICATIONS

"Error Control Coding", Shu Lin et al. pp. 458–459, 477–481 1983.

Primary Examiner—Curtis Kuntz
Assistant Examiner—William G. Trost
Attorney, Agent, or Firm—Foley & Lardner

[57] ABSTRACT

A data transmission system for a radio section is improved in that the transmission rate can change in response to circuit conditions in the radio section, and FEC (forward error correction) and ARQ (automatic repeat request) can be used singly or in combination to achieve maximum transmission efficiency. The system includes an interworking apparatus 6 connected to a mobile communication switching network. Interworking apparatus 6 includes interface section 61 for transmitting and receiving a wire transmission signal from a fixed telephone network and a radio transmission signal from a mobile station, protocol conversion section 63 for converting a wire transmission signal to a radio transmission signal and for converting a radio transmission signal to a wire transmission signal, storage section 64 in which information regarding transmission rates and error controlling modes is stored in advance, and control section 62 which refers to storage section 64 and selects a transmission rate and an error controlling mode in response to circuit conditions of the radio section.

8 Claims, 2 Drawing Sheets

DATA TRANSMISSION METHOD AND APPARATUS OF MOBILE RADIOCOMMUNICATION SYSTEM

BACKGROUND OF THE INVENTION

1. Field of the Invention

This invention relates to a data transmission system, and more particularly to a data transmission method and apparatus for a mobile radiocommunication system.

2. Description of the Related Art

In conventional mobile radiocommunication systems, either of two methods of realizing error-free data transmission are employed: forward error correction (hereinafter referred to as FEC) wherein self correction is performed; or automatic repeat request (hereinafter referred to as ARQ) wherein a request for transmission of data is repeated at the transmission side when a transmission error of data occurs at the reception side.

The conventional data transmission systems described above have different disadvantages. The FEC is disadvantageous in that, in a radio section in which the transmission characteristics are good, transmission efficiency by FEC is low, and the ARQ is disadvantageous in that the transmission efficiency is low in a radio communication section in which the transmission characteristics are poor due to the very significant increase in the number of repeats of data transmission.

SUMMARY OF THE INVENTION

It is an object of the present invention to provide data transmission wherein the transmission rate changes in response to circuit conditions in a radio section which are not always stable, wherein either one or both of FEC and ARC are selectively used as the error controlling mode to achieve maximum transmission efficiency.

It is a further object of present invention to provide a data transmission method for mobile radio-communication system in which a data terminal of a mobile station is connected to another data terminal through a fixed terminal public telephone network, a mobile communication switching network and a radio base station, wherein the method comprises the steps of:

monitoring the frequency of an automatic repeat request from the receiving side of retransmission of data caused by erroneous reception; and determining and setting an adequate transmission rate and error controlling mode for the radio transmission section according to the result of monitoring by referring to information stored in advance for guiding setting of transmission rate and error controlling mode according to variation in the state of radio transmission.

It is another object of the present invention to provide a data transmission apparatus for a mobile radio-communication system in which the apparatus connects a data terminal of a mobile station to another data terminal through a fixed terminal public telephone network, a mobile communication switching network and a radio base station, the data transmission apparatus comprising:

a section for transmitting and receiving both a wire transmission signal for use in wire transmission to and from the fixed terminal telephone network and a radio transmission signal for use in radio transmission to and from the mobile station;

a protocol conversion section for converting a radio transmission signal to a wire transmission signal and for converting a wire transmission signal to a radio transmission signal;

a storage section for storing in advance information regarding transmission rate and error controlling mode;

a monitor section for monitoring the state of transmission of the radio section; and a retrieve section for retrieving from the storage section information pertaining to an adequate transmission rate and error correcting mode in response to the state of transmission.

The data transmission apparatus for the mobile radiocommunication system described above may also include, as a monitor section in the radio section, a counter to count the frequency of repeated requests for retransmission.

Other objects of this invention will become obvious upon understanding the illustrative embodiments described or indicated in the appended claims, and various advantages not referred to herein will occur to one skilled in the art upon putting the invention into practice.

DESCRIPTION OF THE PREFERRED EMBODIMENT

An embodiment of the data transmission system for mobile radiocommunication system of the present invention is described below with reference to the drawings.

Figure 1:
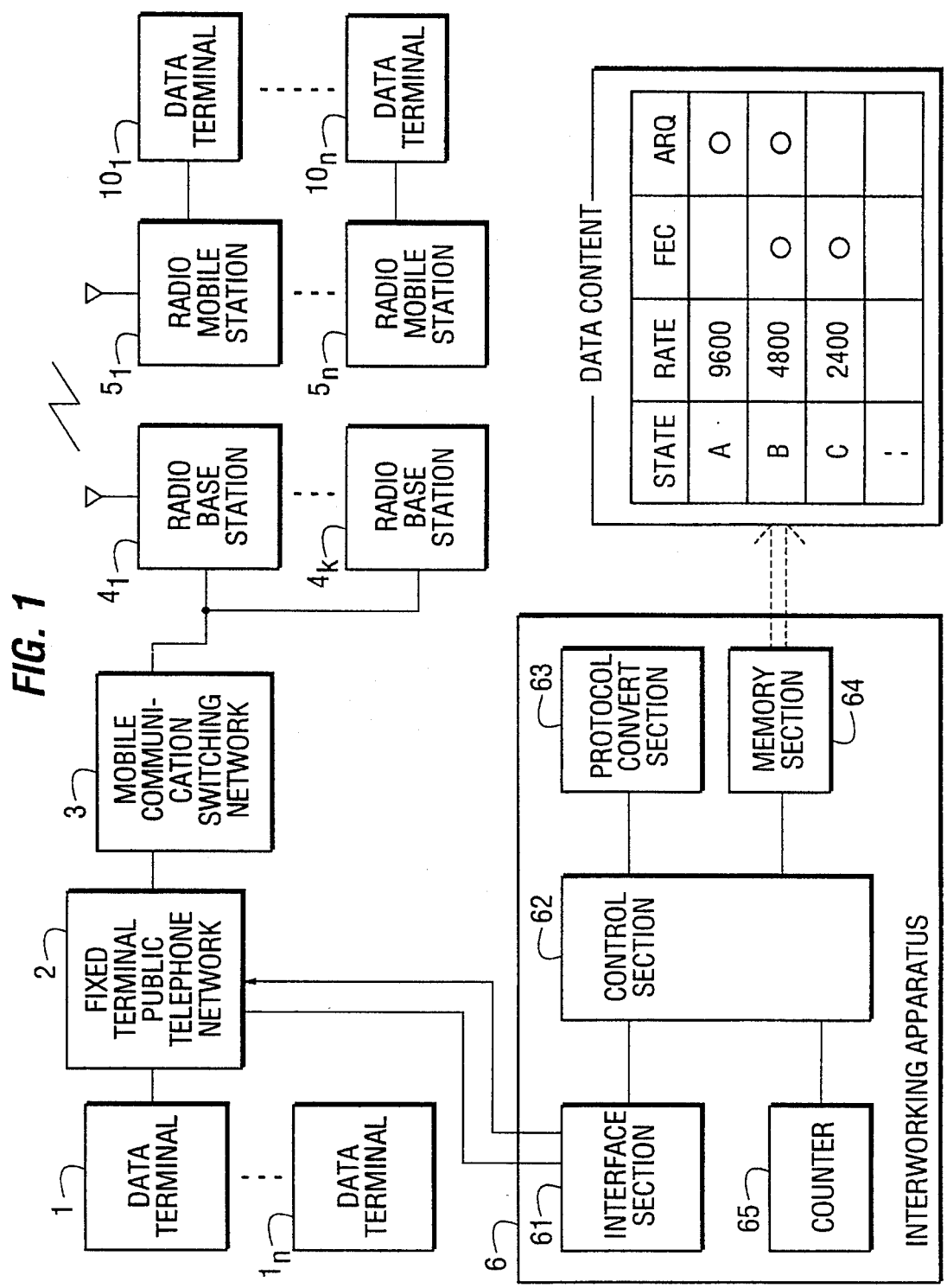
FIG. 1 is a block diagram of an embodiment of the data transmission system for mobile radiocommunication system of the present invention.

FIG. 1 is a functional block diagram showing an embodiment of the present invention.

Figure 2:
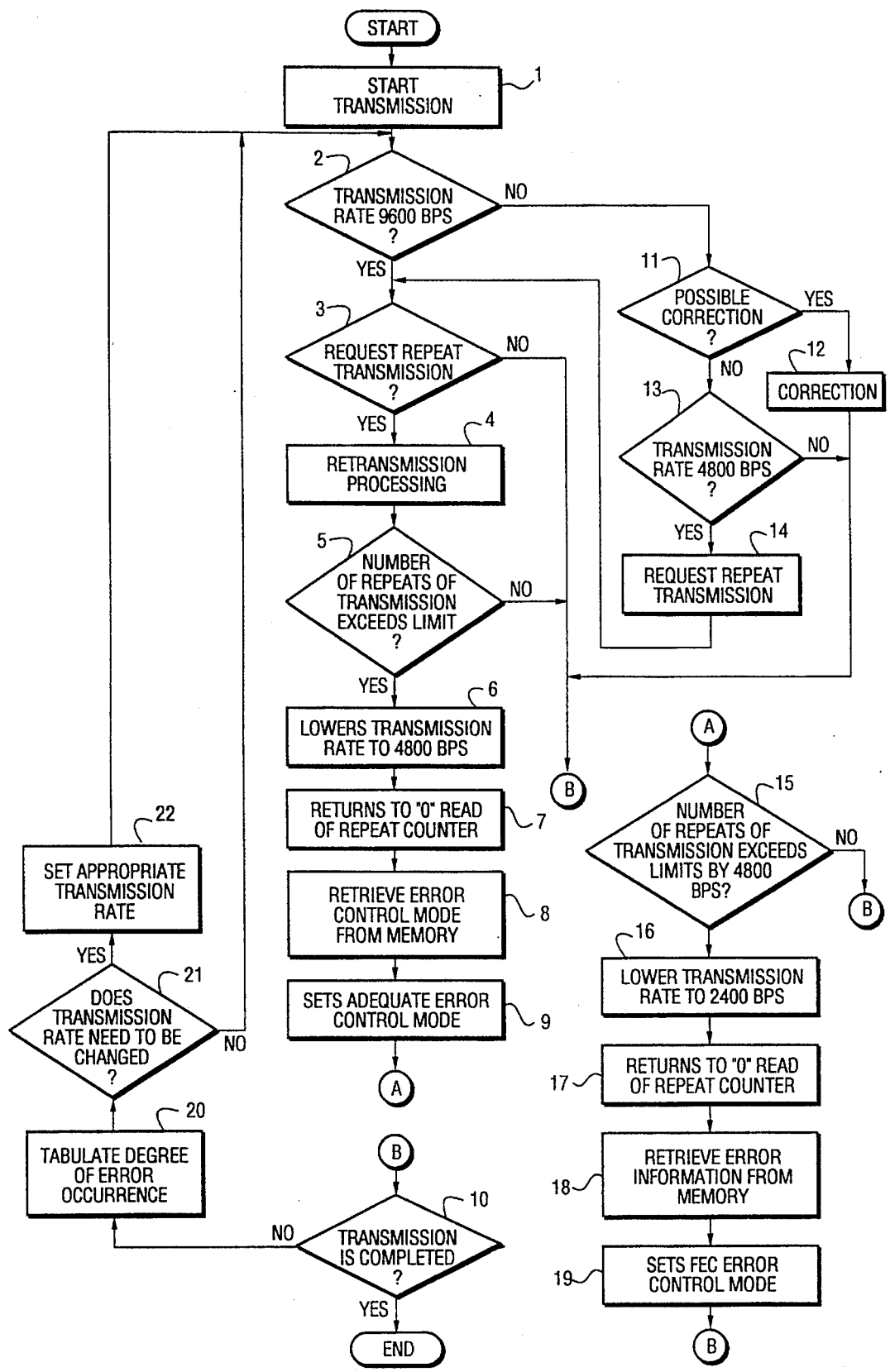
FIG. 2 is a flow chart of the embodiment of the data transmission system for mobile radiocommunication of the present invention.

FIG. 2 is a flow chart showing an example of a data transmission method of the present invention.

Referring to FIG. 1, a plurality of data terminals $1_1$–$1_n$ are connected to a fixed terminal public telephone network 2, and a plurality of data terminals $10_1$–$10_m$ are provided within corresponding mobile stations $5_1$–$5_m$. Mobile communication switching network 3 is connected to fixed terminal public telephone network 2 and radio base stations $4_1$–$4_k$. Interworking apparatus 6 is connected to mobile communication switching network 3. Here, the mobile communication switching network is a network for switching calls between the mobile radiocommunication system and fixed station public telephone network.

Interworking apparatus 6 includes interface section 61 for transmitting and receiving both wire transmission signals for use in wire transmission and radio transmission signals for use in radio transmission, protocol conversion section 63 for converting a wire transmission signal into a radio transmission signal and for converting a radio transmission signal into a wire transmission signal, storage section 64 in which information regarding transmission rates and error controlling systems is stored in advance, counter 65 which counts frequency of repeat transmission requests, and control section 62 for effecting control by changing the transmission rate in response to a circuit condition, that is, the degree of error occurrence, in a radio section and by determining an error controlling mode to be applied referring to storage section 64.

A wire transmission signal from data terminal 1₁ connected to public telephone network 2 is transmitted to interworking apparatus 6 by way of mobile communication switching network 3. The transmitted wire transmission signal is transmitted through interface section 61 and control section 62 to protocol conversion section 63, in which protocol conversion from a wire transmission signal to a radio transmission signal is performed. After conversion, the radio transmission signal is transmitted to mobile communication switching network 3 again through control section 62 and interface section 61 and further transmitted from radio base station 4₁ to mobile station 5₁ by radio communication and then from mobile station 5₁ to individual data terminal 10₁.

Similarly, when transmitting from one mobile station 5₁ to another mobile station 5_m, a signal is transmitted from radio base station 4₁ to interworking apparatus 6 by way of mobile communication switching network 3 and then transmitted from interworking apparatus 6 by way of mobile communication switching network 3 to radio base station 4_k and then from radio base station 4_k to mobile station 5_m.

Operation of the present embodiment is described below with reference to FIG. 2. It is assumed here that the transmission rate upon initialization is 9,600 bps.

After data terminal 1₁ on the fixed station network is connected to data terminal 10₁ on the mobile station side and data transmission is started (step 1), control section 62 determines whether the transmission rate is 9,600 bps or not (step 2). Where ARQ mode is employed as the error controlling mode suitable for a transmission rate of 9,600 bps, control section 62 monitors repeat transmission requests (step 3), and if a repeat request is received, control section 62 performs retransmission processing (step 4). On the other hand, when the transmission rate is not 9,600 bps (when the transmission rate is 4,800 bps or 2,400 bps) at step 2, control section 62 determines whether correction by the FEC mode is available or not (step 11), and if the correction is possible, control section 62 performs FEC (step 12). However, if control section 62 determines that correction is not possible and the transmission rate is 4,800 bps, control section 62 performs a repeat request based on the ARQ system (step 14) and repeat processing is performed upon reception of the repeat process request (steps 3 and 4). Control section 62 monitors the state of the circuit of the radio section by counting the number of repeats (step 5). If control section 62 determines that the number of repeats is excessively high and that the circuit quality is therefore poor (condition B) when the transmission rate is 9,600 bps, control section 62 lowers the transmission rate to 4,800 bps (step 6) and then clears the repeat number counter (step 7). Control section 62 then retrieves information regarding error control from storage section 64 (step 8) and sets a simultaneous use mode in which both ARQ and FEC are used (step 9). If control section 62 determines that the number of repeats increases and the circuit quality is worse (condition C) (step 15) when the transmission rate is 4,800 bps, it lowers the transmission rate to 2,400 bps (step 16), retrieves error control information from storage section 64 (step 17, 18), and then sets the FEC mode (step 19). If the transmission is not completed (step 10), then the control section 62 tabulates the degree of error occurrence within a particular time interval (step 20). The control section 62 then determines whether the transmission rate needs to be changed based on the degree of error occurrence (step 21). For example, when in the FEC mode (i.e., 2400 bps transmission rate), if the degree of error occurrence is low (that is, the number of times error correction needs to be performed is low), then the transmission rate will be increased to obtain better data utilization. If the transmission rate needs to be changed as determined in step 21, then the control section 62 sets the appropriate transmission rate (step 22), and the process returns to step 2. If the transmission rate does not need to be changed as determined in step 21, then the process goes directly to step 2.

As described above, the data transmission system for mobile radiocommunication of the present invention is advantageous in that, since a data transmission rate can be selected in response to circuit conditions and an error controlling system suitable to the transmission rate can be selected, a transmission rate providing the highest efficiency can be achieved.

What is claimed is:

1. A data transmission method through a mobile radiocommunication network in which a data terminal of a radio mobile station is connected to another data terminal through a fixed terminal public telephone network, a mobile communication switching network and a radio base station, said method comprising the steps of:

setting a data transmission rate for a data transfer between the data terminal and the another data terminal;

setting a data transmission mode to one of an automatic repeat request (ARQ) mode, a forward error correction (FEC) mode, and a combined ARQ and FEC mode for the data transfer between the data terminal and the another data terminal according to the data transmission rate, wherein if the data transmission rate is at a first rate, the data transmission mode is set to the ARQ mode, else if the data transmission rate is less than the first rate, the data transmission mode is set to one of a) the combined ARQ and FEC mode and b) the FEC mode;

if the data transmission mode is set to the ARQ mode, then monitoring a number of repeat transmission requests within a first time period of the data transfer between the data terminal and the another data terminal;

if the ARQ mode is set as the data transmission mode and the number of repeat transmission requests within the first time period is greater than a second value, then resetting the data transmission mode to the combined ARQ and FEC mode and resetting the data transmission rate to a second rate that is lower than the first rate; and if the combined ARQ and FEC mode is set as the data transmission mode and the number of repeat transmission requests within the first time period is greater than a third value, then resetting the data transmission mode to the FEC mode and resetting the data transmission rate to a third rate that is lower than the second rate.

2. The data transmission method according to claim 1, wherein the data transmission rate is operable to be set to rates including the first rate, the second rate, and the third rate, the first rate being greater than the second rate, and the second rate being greater than the third rate;

wherein the data transmission rate is initially set to the first rate;

and wherein when the data transmission rate is set to the first rate, only the ARQ mode is selected as the data transmission mode, and when the data transmission rate is set to the second rate, both the ARQ mode and the FEC mode are selected as the data transmission mode, and when the data transmission rate is set to the third rate, only the FEC mode is selected as the data transmission rate.

3. The data transmission method according to claim 2, wherein the first rate is 9600 bits per second, the second rate is 4800 bits per second, and the third rate is 2400 bits per second.

4. The data transmission method according to claim 1, further comprising the step of:

determining a number of occurrences of error correction when the data transmission mode is in the FEC mode; and when the number of occurrences of error correction exceeds a predetermined value, resetting the data transmission mode to the combined ARQ and FEC mode and resetting the data transmission rate to the second rate.

5. A data transmission system that operates with a mobile radio-communication network in which a data terminal of a radio mobile station is connected to another data terminal through a fixed terminal public telephone network, a mobile communication switching network and a radio base station, said data transmission system comprising:

means for transmitting and receiving both a wire transmission signal for use in wire transmission to and from the fixed terminal public telephone network and a radio transmission signal for use in radio transmission to and from the radio mobile station;

protocol conversion means for converting a radio transmission signal into a wire transmission signal and for converting a wire transmission signal into a radio transmission signal;

storage means for storing information concerning transmission rates and error controlling modes corresponding to each of the transmission rates, said error controlling modes including a forward error correction (FEC) mode, an automatic request repeat (ARQ) mode, and a combined automatic request repeat/forward error correction (ARO/FEC) mode;

means for monitoring a number of repeat requests during the ARQ mode;

means for setting a data transmission rate from the transmission rates when the number of repeat requests exceeds a predetermined value; and means for setting one of the corresponding error controlling modes based on the data transmission rate set by the data transmission setting means.

6. The data transmission system according to claim 5, wherein the data transmission rate is set to one of a first rate, a second rate, and a third rate, the first rate being greater than the second rate, and the second rate being greater than the third rate;

and wherein when the data transmission rate is set to the first rate, only the ARQ mode is selected as the error controlling mode, and when the data transmission rate is set to the second rate, both of the ARQ mode and the FEC mode are selected as the error controlling mode, and when the data transmission rate is set to the third rate, only the FEC mode is selected as the error controlling mode.

7. The data transmission system according to claim 6, wherein the first rate is 9600 bits per second, the second rate is 4800 bits per second, and the third rate is 2400 bits per second.

8. The data transmission system according to claim 6, further comprising means for determining a number of occurrences of error correction when the error controlling mode is the FEC mode and the data transmission rate is the third rate, wherein when the number of occurrences of error correction exceeds a predetermined value, the error controlling mode is reset from the FEC mode to a combined ARQ and FEC mode and the data transmission rate is reset from the third rate to the second rate.

\* \* \* \* \*